Figures 1, 2:
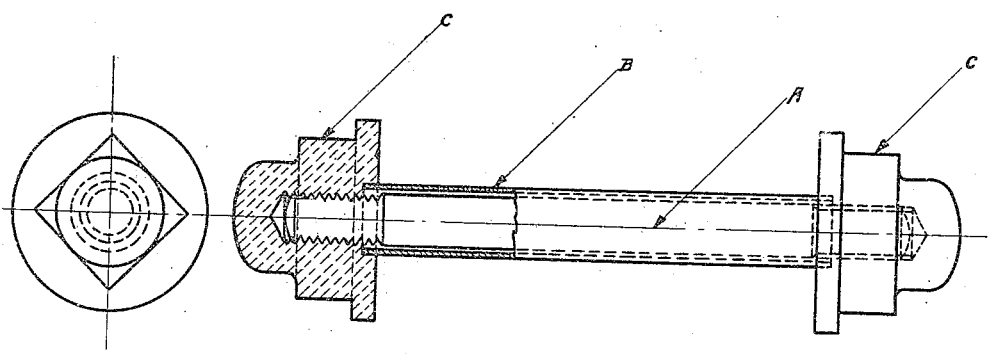

R. WILLIAMS.
SLEEVE BOLT.
APPLICATION FILED APR. 16, 1917.

1,267,030.

Patented May 21, 1918.

INVENTOR.
Richard Williams
by Bates & Macklin.
Atty.

UNITED STATES PATENT OFFICE.

RICHARD WILLIAMS, OF CLEVELAND, OHIO.

SLEEVE-BOLT.

1,267,030.

Specification of Letters Patent. Patented May 21, 1918.

Application filed April 16, 1917. Serial No. 162,535.

*To all whom it may concern:*

Be it known that I, RICHARD WILLIAMS, a citizen of the United States, residing at Cleveland, in the county of Cuyahoga and State of Ohio, have invented a certain new and useful Improvement in Sleeve-Bolts, of which the following is a full, clear, and exact description, reference being had to the accompanying drawings.

This invention relates to bolts for use in construction of tanks for containing baths of acid. Heretofore, in the construction of wooden tanks for galvanizing, plating and the like, the acid used corrodes and destroys the bolts, and, to avoid this difficulty, bolts of expensive alloys, and even of pure copper, have been used, but even these costly bolts are comparatively short lived. Furthermore, once the shank of the bolt passing through several planks of such a tank, is corroded, it is very difficult, and sometimes impossible, to remove the same for replacement by a new bolt.

The object of this invention is to obviate the above and other difficulties and provide a bolt which may have the usual iron shank, obtaining the necessary strength and cheapness, while entirely inclosing this bolt by a non-corrosive sleeve and cap nuts.

My invention is more fully described in connection with the accompanying drawing and in the following description other advantages will become apparent. The essential characteristics are set forth in the claims.

In the drawing, Figure 1 is a side elevation partly in section of a sleeve-bolt embodying my invention. Fig. 2 is an end view of the structure shown in Fig. 1.

Referring to the drawing, A indicates a bolt made of ordinary iron or steel, as required, and of any desirable diameter and length. B indicates a sleeve loosely surrounding the bolt and made of a metal acid and rust proof and non-corrosive. I have found that substantially pure lead is very satisfactory to resist a large number of acids. This sleeve may be passed through several planks or beams used in the construction of acid tanks, the bolt A then passed through the sleeve, and the cap nuts C threaded onto the ends of the bolt and tightened in position.

The nuts C are also made of non-corrosive acid-proof metal, which may be tougher than the sleeve to provide strong threads.

A satisfactory composition for resisting many acids may comprise essentially one part antimony and three parts lead. The cap nuts preferably comprise a washer-like portion, an angular portion and an elongated rounded closure made integral, thus securing the desired length of thread. The inner side of the cap nuts tightly fit the heads of the sleeves, preferably by a counterbore embracing the exterior of the sleeve at the ends, thus providing for a longitudinal adjustment for tightening, while still securing the engagement with the sleeve providing for entirely inclosing the iron or steel bolt.

It will be seen that the bolt when in use, provides the necessary strength, allows the desired tightness, and, by reason of the acid-proof sleeve and cap nuts, inclosing the bolt, the life of the bolt may be very greatly prolonged, as it is even protected from the ordinary oxidation, as well as from the effects of the acid. Another advantage is that the bolts may be very readily removed by unscrewing one or the other of the nuts and withdrawing the bolt from the sleeve, whereas with the bolts heretofore used, after they have become rusted or corroded by the acid they frequently are so completely eaten as to be severed, thus making it impossible to either drive or pull them entirely from the members secured thereby.

Having thus described my invention, what I claim is:

1. The combination with an iron bolt having a threaded portion, of a sleeve surrounding and inclosing the shank of the bolt, a cap nut engaging the threads for inclosing the same and having a counterbored portion closely embracing the exterior of the sleeve.

2. The combination with an iron bolt having a threaded portion, of a sleeve surrounding and inclosing the shank of the bolt, a cap nut engaging the threads for inclosing the same and having a counterbored portion closely embracing the exterior of the sleeve and having a shoulder within the counterbore to abut the end of the sleeve, said cap nut comprising an integral member having a washer-like portion, an angular portion, and an extension closure.

3. The combination, with a bolt of iron or like material threaded at each end, a sleeve loosely embracing the shank of the bolt and extending to the threaded portions, and cap nuts embracing the threaded portion and overlapping the sleeve and tightly fitting the ends of the same, said sleeve and cap nuts being made of non-corrosive acid-resisting material.

In testimony whereof I hereunto affix my signature.

RICHARD WILLIAMS.

Copies of this patent may be obtained for five cents each, by addressing the "Commissioner of Patents, Washington, D. C."